Feb. 21, 1939.  H. S. NICHOLS  2,147,796
COTTON GIN
Filed Nov. 24, 1937  3 Sheets-Sheet 3

Inventor
Herbert S. Nichols
By A. D. Adams
Attorney

Patented Feb. 21, 1939

2,147,796

UNITED STATES PATENT OFFICE 2,147,796

COTTON GIN

Herbert S. Nichols, Rome, Ga.

Application November 24, 1937, Serial No. 176,325

4 Claims. (Cl. 19—55)

This invention relates to cotton gins and, among other objects, aims to provide a greatly improved ribless multiple saw gin having a maximum capacity and provided with improved means to clean the seeds thoroughly of the clinging lint and means to prevent the saws from bending breaking or cutting the fiber of either short or long staple cotton. Another object is to provide an improved saw assembly wherein the saws are annular and are removably secured to a mandrel. Still another aim is to provide an improved roll carrier having provision to prevent sagging and choking the saws and to promote uniform feeding. Also, the invention provides novel seed rollers in the gin breast coacting with the saws to deliver the initially cleansed seeds a second and even a third time to the cleansing action of the saw teeth, whereby practically all of the clinging fibers are removed.

Other aims and advantages of the invention will appear in the specification, when considered in connection with the accompanying drawings, wherein.

Figure 1:
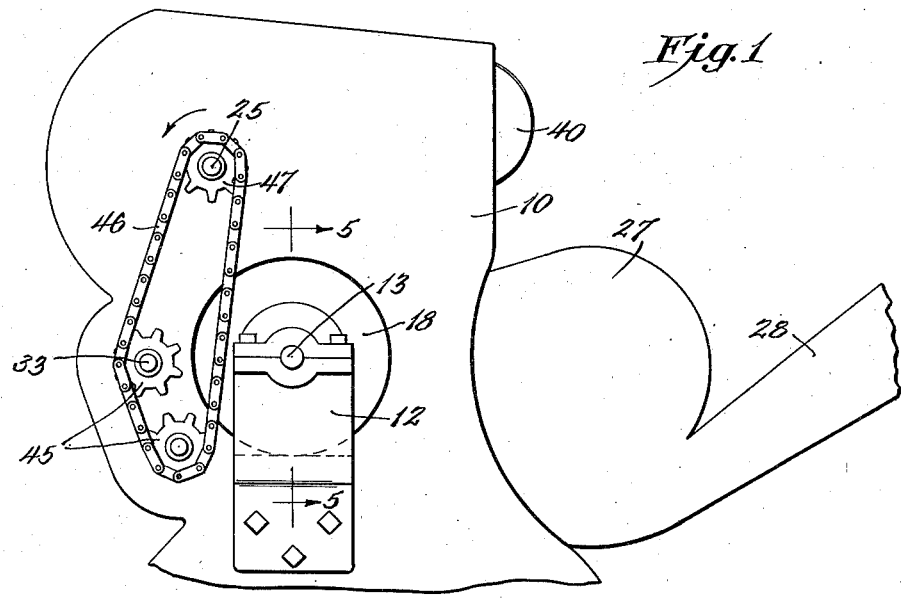
Figs. 1 and 2 are opposite end elevations of a gin embodying the invention.
Figure 2:
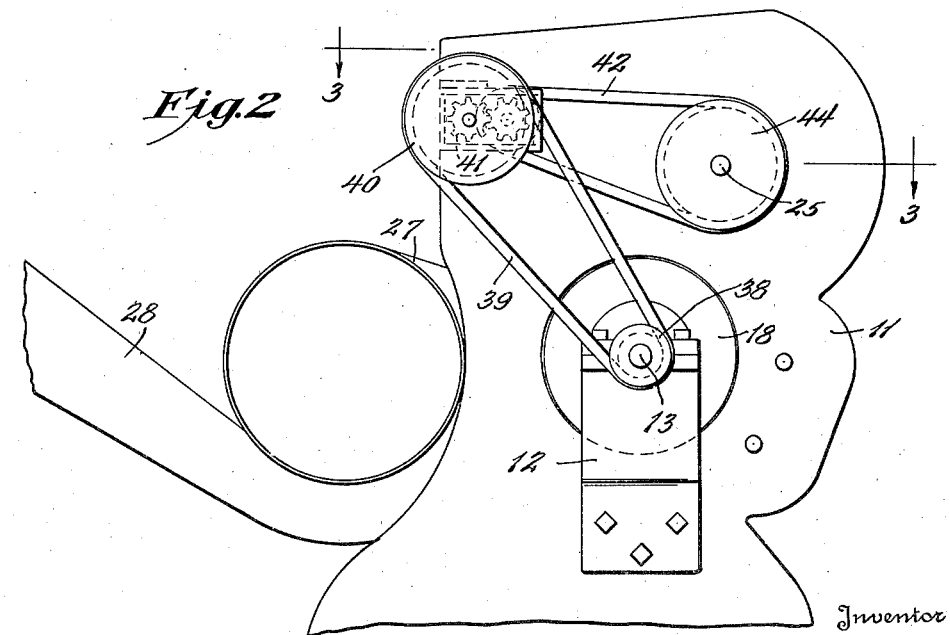
Figure 3:
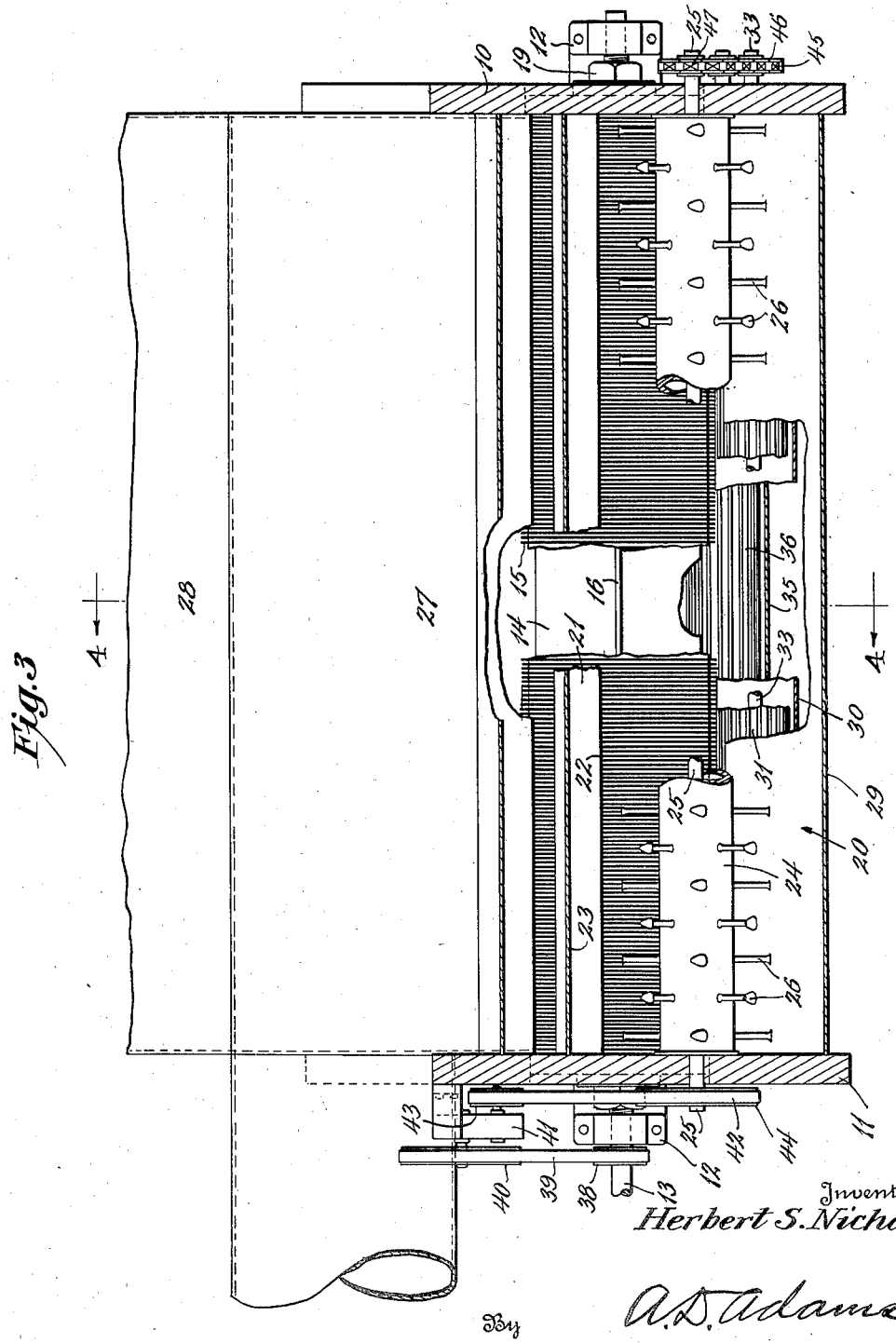
Fig. 3 is a horizontal sectional view taken on the line 3—3 of Fig. 2.
Figure 4:
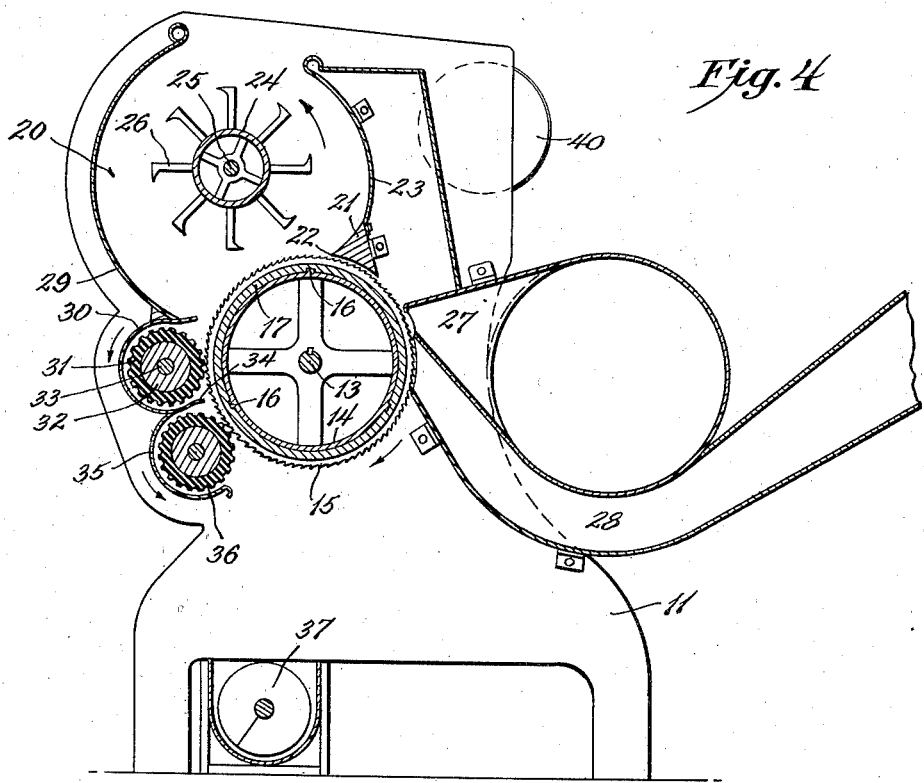
Fig. 4 is a sectional view taken on the line 4—4 of Fig. 3.
Figure 5:
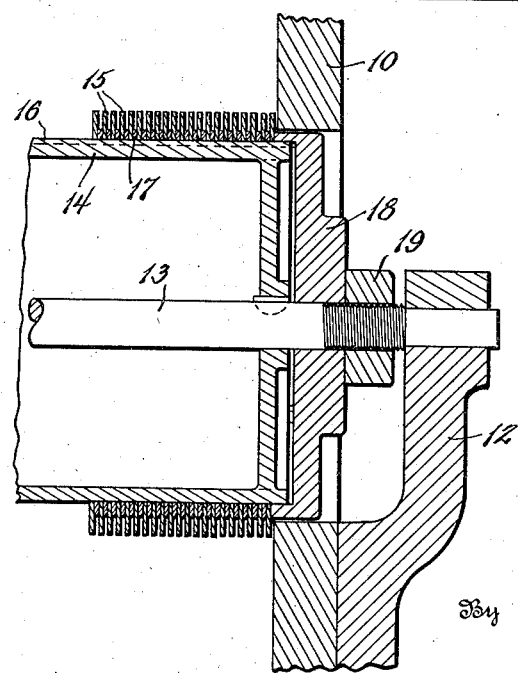
Fig. 5 is an enlarged fragmentary sectional view taken on the line 5—5 of Fig. 1.

Referring particularly to the drawings, the gin there shown has suitable side frames or supports 10 and 11 carrying conventional bearing brackets 12 at the opposite ends for the saw shaft 13 which carries a cylindrical mandrel 14 on which a series of annular saws 15 are removably secured.

Herein, the mandrel 14 is shown as having a plurality of longitudinal tongues 16 and saws having corresponding notches or grooves to hold them against rotation on the mandrel. They are spaced apart by thin annular spacer rings 17 also having notches and these rings are smaller in diameter than the saws. The space between the saws is less than the smallest dimension of the cotton seeds so that the seeds cannot pass between them. The saws and spacers are easily slipped on the mandrel and are shown as being clamped in place by flanged clamping heads 18 and nuts 19 screwed on the shaft 13. This arrangement of the saws enables them to be quickly removed. Also, they are not subject to bending like the ordinary saws. Moreover, slight bends in them caused by obstructions or choking will do no harm.

The saws extend the full length of the gin and are adapted to be driven by any conventional belt or motor drive (not shown). The saw cylinder rotates in the direction indicated and is arranged below a roll box 20. A seed separating bar 21 shown as being generally triangular in cross section presenting a case hardened separating edge 22 is secured between the end frames at the bottom of the front wall 23 of the roll box and to one side of the vertical center line of the saw cylinder. The separating edge is preferably about three thirty-seconds of an inch from the tips of the saw teeth to prevent any seeds from passing under it. The opposite edge is spaced farther from the teeth to provide adequate clearance for the lint carried by the saws. One face of the bar constitutes a continuation of the roll box wall so that separated ends can easily roll upwardly in the roll box.

The roll carrier is shown as being in the form of a cylinder 24 mounted on a shaft 25 and having staggered rows of alligator spikes 26 presenting sharp hooked ends pointing in the direction of rotation. They are preferably somewhat similar to rail spikes and are conveniently welded to the cylinder. The teeth are designed to support the weight of the seed cotton roll and prevent it from sagging in the middle and choking the saws. Also, the roll is more uniform and permits uniform feeding of seed cotton to the saws below it. The seed cotton is fed into the roll box by any conventional feeder (not shown). It drops upon and clings to the roll and, as the roll enlarges, it carries the clinging cotton into contact with the saw teeth which pick off the lint and the separating bar directs the partially cleansed seeds upwardly to be picked up and carried around by the roll. The lint is preferably picked off the saws by an ordinary blower nozzle 27 which directs it into a conduit 28 leading to the press.

The partially cleansed seeds are carried upwardly and around with the roll and fall off against the bottom portion of the front wall 29 of the roll box. They are guided toward the saws by said wall, some of them actually coming in contact with the saw teeth. Then the seeds fall into a chamber formed by an arcuate hood or sheet metal housing 30 against a longitudinally corrugated seed roll 31 conveniently made of hard rubber on a wood or metal cylinder 32 and carried by a shaft 33. This roll picks up the seeds in its corrugations and carries them around the inside of the hood and delivers them on a ledge or lip 34 again into cleaning contact with the saw teeth. Thence, they fall into a second seed roll chamber 35 carrying another corrugated roller 36 which further confines them for cleaning by contact with the saw teeth before they are carried around within the hood and finally fall into the usual seed conveyor 37.

The roll carrier is shown as being driven by a pulley 38 on the saw shaft conveniently connected by a belt 39 to a pulley 40 which drives reversing gears 41. A second belt 42 connects a pulley 43 of the reversing gears to a pulley 44 on the roll carrier shaft 25. The two seed roller shafts are shown as having sprockets 45 which are driven by a chain 46 on a driving sprocket 47 on the opposite end of the roll carrier shaft.

By selecting the proper sizes of the sprockets, the relative speeds of the roll carrier and the seed rollers may be varied to produce the best results.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A cotton gin comprising, in combination, a hollow saw cylinder carrying a multiplicity of removable annular saws; a generally triangular separating bar having a sharp edge adjacent to the saw teeth; a roll box having one wall of which a face of the separating bar forms a continuation; a roll carrier within the box; and means below the roll box to feed the separated seeds against the saws for recleaning.

2. A cotton gin comprising, in combination, a saw cylinder carrying a multiplicity of annular saws; a separating bar cooperating with the saws; a roll carrier above the saws; and a seed roller connected to convey the separated seeds into cleaning contact with the saws before they leave the gin.

3. A cotton gin comprising, in combination, a saw cylinder carrying a multiplicity of annular saws; a separating bar cooperating with the saws; a roll carrier above the saws; and a pair of spaced longitudinally corrugated seed rollers adjacent to the saws arranged to cause the seeds to come in cleaning contact with the saw teeth after they are initially separated from the lint.

4. In a multiple saw gin having a separating bar cooperating with the saws and a roll support above the saws, a pair of longitudinally corrugated seed rollers adjacent to the saws arranged to catch the seeds in succession as they fall off the roll and expose them to the saw teeth for further cleaning; each roller having a hard composition covering in which the corrugations are formed.

HERBERT S. NICHOLS.